US010081265B2

(12) United States Patent
Oestreicher et al.

(10) Patent No.: US 10,081,265 B2
(45) Date of Patent: Sep. 25, 2018

(54) CIRCUIT SYSTEM FOR A CHARGING STATION, CHARGING STATION AND USE OF A CHARGING STATION

(71) Applicant: Dr. Ing. h.c. F. Porsche Aktiengesellschaft, Stuttgart (DE)

(72) Inventors: Ralf Oestreicher, Sindelfingen (DE); Dirk Herke, Kirchheim unter Teck (DE); Anja Heinzelmann, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/421,801

(22) Filed: Feb. 1, 2017

(65) Prior Publication Data
US 2017/0225580 A1 Aug. 10, 2017

(30) Foreign Application Priority Data

Feb. 5, 2016 (DE) .................. 10 2016 102 053

(51) Int. Cl.
*H02J 7/00* (2006.01)
*B60L 11/18* (2006.01)
(52) U.S. Cl.
CPC ......... *B60L 11/1825* (2013.01); *B60L 11/182* (2013.01); *B60L 11/1811* (2013.01); *H02J 7/00* (2013.01); *B60L 2210/10* (2013.01); *Y02T 10/7005* (2013.01); *Y02T 10/7072* (2013.01); *Y02T 10/7216* (2013.01); *Y02T 90/121* (2013.01); *Y02T 90/122* (2013.01); *Y02T 90/127* (2013.01); *Y02T 90/128* (2013.01); *Y02T 90/14* (2013.01)

(58) Field of Classification Search
CPC ........................................................ H02J 7/00
USPC ............................................................. 320/109
See application file for complete search history.

(56) References Cited

U.S. PATENT DOCUMENTS

| | | | |
|---|---|---|---|
| 9,873,341 B2* | 1/2018 | Albanna | B60L 11/1812 |
| 2013/0020989 A1* | 1/2013 | Xia | H02M 7/2176 |
| | | | 320/109 |
| 2013/0307486 A1 | 11/2013 | Chang | |
| 2017/0036555 A1* | 2/2017 | Albanna | B60L 11/1812 |
| 2017/0050528 A1* | 2/2017 | King | B60L 11/1803 |

OTHER PUBLICATIONS

German Search Report for German Application No. 10 2016 102 0532, dated Sep. 9, 2016 with partial translation, 9 pages.

* cited by examiner

*Primary Examiner* — Suchin Parihar
(74) *Attorney, Agent, or Firm* — RatnerPrestia

(57) ABSTRACT

A circuit system for a charging station which is configured to charge an energy store in a vehicle, the circuit system including a transformer with transformer outputs which are DC-isolated from one another, a first subsystem and a second subsystem each being connected to one of the transformer outputs. The first subsystem and the second subsystem each include a rectifier which has a DC-DC converter connected upstream of it, the DC-DC converter being coupled to a changeover logic unit on its input side or on its output side. In particular, provision is made for the first subsystem to be connected to a delta circuit in the transformer output and for the second subsystem to be connected to a star circuit in the transformer output.

9 Claims, 2 Drawing Sheets

CIRCUIT SYSTEM FOR A CHARGING STATION, CHARGING STATION AND USE OF A CHARGING STATION

CROSS-REFERENCE TO RELATED APPLICATIONS

This application claims priority to German Patent Application No. 102016102053.2, filed Feb. 5, 2016, the content of such application being incorporated by reference herein in its entirety.

FIELD OF THE INVENTION

The present invention relates to a circuit system for a charging station, to a charging station and to use of a charging station.

BACKGROUND OF THE INVENTION

Charging stations which are intended to charge an energy store in a vehicle are sufficiently well known. Typically, voltages must be accordingly modified here before they can be used by a user as the voltage for charging the energy store of a vehicle. Transformers, rectifiers and step-down converters are generally used to adapt an input voltage provided by an energy supplier to the requirements needed for a corresponding charging operation in a manner which is as flexible as possible.

SUMMARY OF THE INVENTION

One object of the present invention is to improve circuit systems which are known from the prior art for a charging station which is intended to charge an energy store in a vehicle. This is achieved by means of a circuit system for a charging station which is intended to charge an energy store in a vehicle, the circuit system comprising a transformer with transformer outputs which are DC-isolated from one another, a first subsystem and a second subsystem each being connected to one of the transformer outputs, the first subsystem and the second subsystem each comprising a rectifier which has a DC-DC converter connected upstream of it, the DC-DC converter being coupled to a changeover logic unit on its input side or on its output side.

In comparison with the prior art, the circuit system according to aspects of the invention has the advantage that both DC isolation with respect to a mains supply and DC isolation to be maintained up to the vehicles are achieved in the transformer. In addition, the circuit system allows the DC-DC converter to be able to be provided with secondary voltages which are lower than primary voltages which would otherwise occur if the rectifiers of the first and second systems were coupled to one another and would accumulate according to their coupling. Consequently, the circuit system according to aspects of the invention advantageously makes it possible to provide voltages of below 1000 V in the region between the rectifier and the DC-DC converter. If a plurality of DC-DC converters, which are coupled to one another via a changeover logic unit, are provided, the voltage requirements imposed on the respective DC-DC converters can therefore be reduced. At the same time, the changeover logic unit according to aspects of the invention allows a desired voltage range, for example between 200 V and 1000 V, to be covered for a charging operation of the vehicle.

In particular, the rectifiers are a six-pulse rectifier. Provision is also made for the changeover logic unit to comprise switches which can be used to change over between a parallel connection and a serial connection of the DC-DC converters in a targeted manner. In particular, a DC-DC converter, preferably a separate DC-DC converter, is assigned to each rectifier.

A further embodiment of the present invention provides for the changeover logic unit to connect outputs of the DC-DC converters of the first subsystem and of the second subsystem in parallel or in series. In particular, provision is made in this case for the DC-DC converters to be connected in parallel or in series on their output sides. The desired output voltages can be achieved at the charging station by connecting the voltages present on the output side of the DC-DC converter in parallel or in series. In this case, it is conceivable that it is possible to change between a parallel circuit and a series circuit using the switches of the changeover logic unit. It is also conceivable for voltages which are present on the output side of one of the DC-DC converters to be connected or disconnected by means of the changeover logic unit.

A further embodiment of the present invention provides for the transformer outputs to have a star circuit and a delta circuit, the first subsystem preferably being connected to a transformer output having a star circuit, and the second subsystem being connected to a transformer output having a delta circuit. Using a star circuit and a delta circuit advantageously dispenses with a "power factor correction (PFC)" stage and makes it possible to reduce the harmonics in two rectifiers.

A further embodiment of the present invention provides for a DC-DC converter to be respectively connected downstream of the rectifier of the first subsystem and the rectifier of the second subsystem, the DC-DC converters being connected in series or in parallel with one another on the output sides of the DC-DC converters.

A further embodiment of the present invention provides for the same DC-DC converter to be connected downstream of the rectifier of the first subsystem and the rectifier of the second subsystem, the rectifiers being connected in series or in parallel via a changeover logic unit, in particular on their output side. In this case, the changeover logic unit is preferably coupled to the input side of the DC-DC converter. In this case, the changeover logic unit is preferably configured in such a manner that it provides the DC-DC converter with either the primary voltage or the secondary voltage. In other words: the changeover logic unit coupled to the input side ensures that the first and second subsystems are connected either in parallel or in series.

A further embodiment of the present invention provides for the DC-DC converter to be a step-down converter or a buck converter.

A further embodiment of the present invention provides for the transformer to be a medium voltage transformer.

The present invention also relates to a charging station comprising a circuit system according to aspects of the invention.

The present invention also relates to use of a charging station according to aspects of the invention for charging an energy store of a vehicle.

BRIEF DESCRIPTION OF THE DRAWING FIGURES

Further details, features and advantages of the invention emerge from the drawings and from the following description of preferred embodiments using the drawings. In this case, the drawings illustrate only exemplary embodiments of the invention which do not restrict the fundamental concept of the invention.

DETAILED DESCRIPTION OF THE INVENTION

Identical parts are always provided with the same reference symbols in the various figures and are therefore generally also named or mentioned only once in each case.

Figure 1:
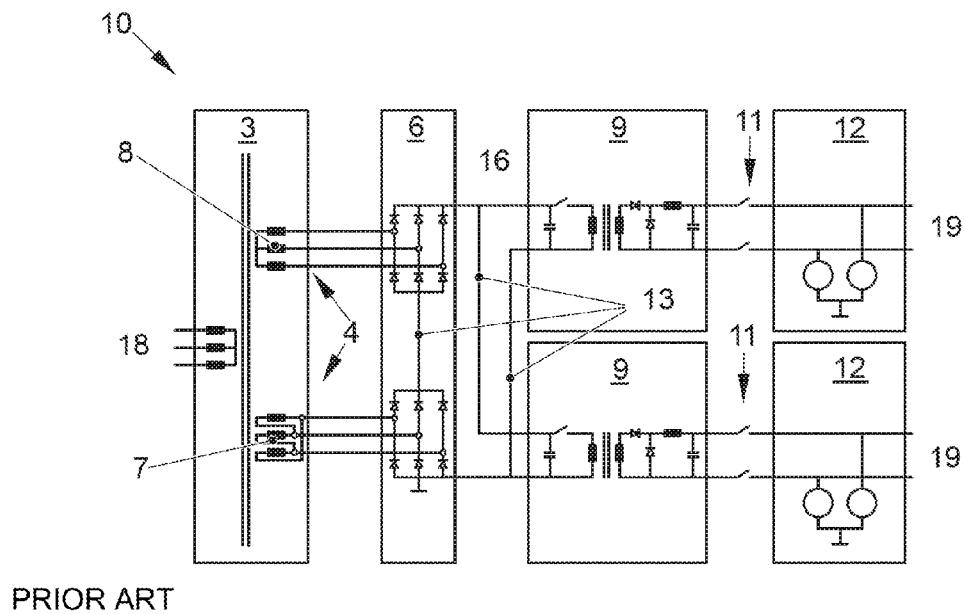
FIG. 1 shows a circuit system according to the prior art.

FIG. 1 illustrates a circuit system 10 according to the prior art. In this case, the circuit system 10 comprises a medium voltage transformer 3, at each of the transformer outputs 4 of which a rectifier 6 is arranged. The rectifiers 6 each connected to the transformer outputs 4 are coupled to one another by means of connections 13, in particular electrically, before two DC-DC converters 9 which are DC-isolated from one another are connected to the rectifiers 6. As a result of the rectifiers 6 being connected, the two DC-DC converters 9 are provided with primary voltages 16, for example between 1000 and 1200 V or lower. In this case, the DC-DC converter 9 is a buck converter or step-down converter or a step-up converter. In addition, the circuit system 10 respectively has an emergency switch system 11 and an isolation monitoring unit 12 connected downstream for the corresponding step-down converter. It is also conceivable for the transformer 3 to comprise a delta winding 7 and a star circuit 8 which are connected to the respective rectifiers 6.

Figure 2:
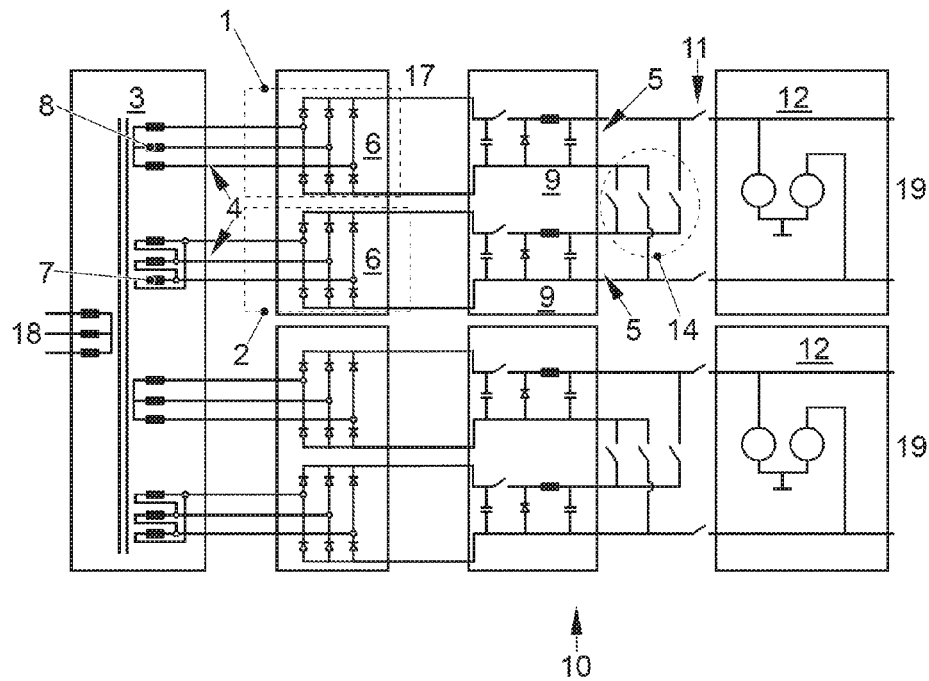
FIG. 2 shows a circuit system according to a first exemplary embodiment of the present invention.

FIG. 2 illustrates a circuit system 10 according to a first exemplary embodiment of the present invention. In this case, provision is made, in particular, for a circuit system 10 to be involved which is used in charging stations, which are intended to charge energy stores in vehicles, and meets the corresponding special requirements. Provision is preferably made in this case for the circuit system 10 to have a transformer 3, in particular a medium voltage transformer. Its DC-isolated transformer outputs 4 are preferably respectively connected to a first subsystem 1 and to a second subsystem 2. In this case, provision is made, in particular, for an input voltage 18 to be applied to the input side of the transformer 3. The transformer 3 preferably has a delta circuit 7 and a star circuit 8 at its transformer outputs 4, the first subsystem 1 being connected to the transformer output 4 having the star circuit 8 and the second subsystem 2 being connected to the transformer output 4 having the delta circuit 7. In particular, the transformer output 4 equipped with the delta circuit 7 and the transformer output 4 equipped with the star circuit 8 form a pair of transformer outputs. In the exemplary embodiment illustrated in FIG. 2, the circuit system 10 comprises two such pairs of transformer outputs. Provision is also made for the first subsystem 1 and the second subsystem 2 to each comprise a rectifier 6 which is respectively connected upstream of a DC-DC converter 9. The DC-DC converter 9 is preferably a step-down converter or buck converter. In particular, in the exemplary embodiment illustrated here, provision is made for the first subsystem 1 and the second subsystem 2 to be isolated from one another as far as the output side 5 and for the DC-DC converters 9 to be connected to one another by means of a changeover logic unit 14 via the output side 5 of the DC-DC converters 9. In this case, in addition to the DC isolation with respect to the supply network, that is to say an AC network, it is advantageously possible to maintain the DC isolation at the transformer outputs 4, including up to the respective DC-DC converter 9 and the vehicles. The vehicles are in turn likewise DC-isolated from one another. In particular, these two forms of DC isolation are implemented in the transformer 3, preferably in a mains transformer. Coupling the DC-DC converters 9 to the output sides 5 of the DC-DC converters 9 and therefore the use of two DC-DC converters 9 opens up the advantageous possibility that the DC-DC converters 9 are each provided with secondary voltages 17 which are lower than the primary voltages 16 and, in particular, are below a critical value, for example 1000 V. Consequently, normative specifications relating to the voltage between the rectifier 6 and the DC-DC converter 9 can be advantageously complied with. In addition, a voltage range of the DC-DC converters 9 connected downstream can be reduced. Furthermore, provision is made for the changeover logic unit 14 to be configured in such a manner that the DC-DC converters 9 can be connected either in parallel or in series via the changeover logic unit 14. This makes it possible to advantageously cover a voltage range required for charging, for example between 200 V and 1000 V. Furthermore, provision is preferably made for an emergency stop switch 11 and isolation monitoring 12 to be connected downstream of the changeover logic unit 14.

Figure 3:
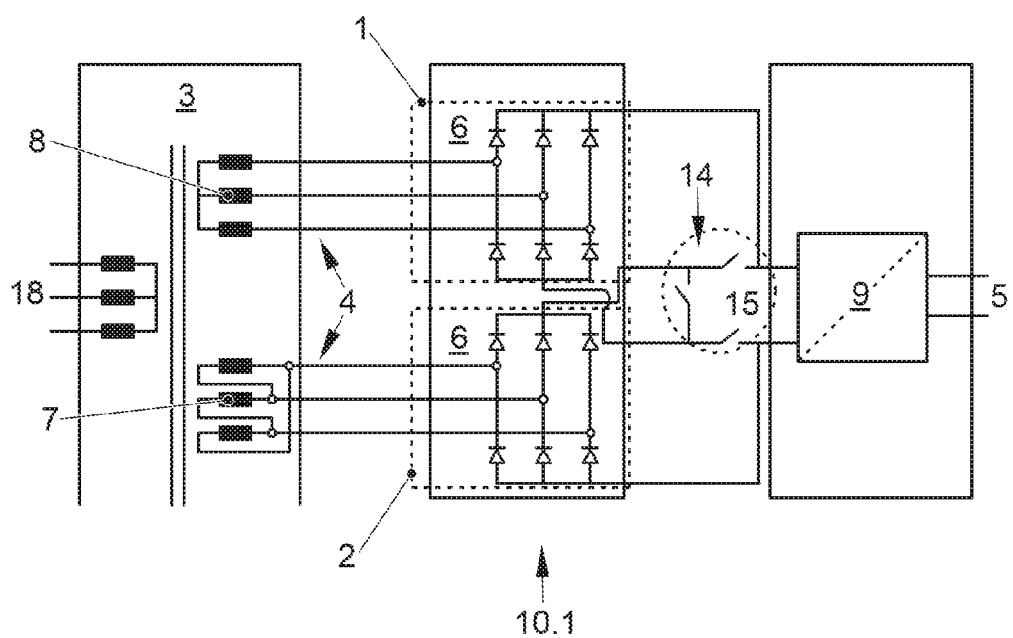
FIG. 3 shows a circuit system according to a second exemplary embodiment of the present invention.

FIG. 3 illustrates a system 10.1 according to a second exemplary embodiment of the present invention. This is preferably a system 10.1 which corresponds, in terms of the basic features, to the system illustrated in FIG. 2 and, in particular, likewise comprises a changeover logic unit, a DC-DC converter and two rectifiers. The exemplary embodiment from FIG. 3 substantially differs from the exemplary embodiment from FIG. 2 in that the rectifiers 6 of the first subsystem 1 and of the second subsystem 2 share a common DC-DC converter 9 and that the changeover logic unit 14 is arranged on an input side 15 of the DC-DC converter 9. Provision is also made for the changeover logic unit 14 to be configured in such a manner that the first subsystem 1 and the second subsystem 2 can be connected either in series or in parallel. In particular, provision is made for the further changeover logic unit 14 to be configured in such a manner that, depending on the connection of the rectifiers 6, in particular 6-pulse rectifiers, two different intermediate circuit voltages or currents, which preferably differ from one another by a factor of 2, are represented. Consequently, the conversion range of the DC-DC converter 9 can be halved, as a result of which either an efficiency is accordingly increased or an output voltage range or output current range for the charging station is adapted.

What is claimed is:

1. A circuit system for a charging station which is configured to charge an energy store in a vehicle, the circuit system comprising a transformer with transformer output circuit groups, the transformer output circuits of each transformer output circuit group DC-isolated from one another, each transformer output circuit of the transformer output circuit group being a delta circuit or a star circuit, a first subsystem connected to a first of the transformer output circuits in a transformer output circuit group and a second subsystem connected to a second of the transformer output circuits of the transformer output circuit group, the first subsystem comprising a first rectifier and the second subsystem comprising a second rectifier DC-isolated from the first rectifier, each rectifier having a DC-DC converter connected upstream of that rectifier, the DC-DC converters coupled to a changeover logic unit on an input side of the changeover logic unit or on an output side of the changeover logic unit.

2. The circuit system as claimed in claim 1, the changeover logic unit connecting outputs of the DC-DC converters of the first subsystem and of the second subsystem in parallel or in series.

3. The circuit system as claimed in claim 1, the transformer outputs having a star circuit and a delta circuit, the first subsystem being connected to a transformer output having a star circuit, and the second subsystem being connected to a transformer output having a delta circuit.

4. The circuit system claimed in claim 1, DC-DC converters respectively being connected downstream of the rectifier of the first subsystem and the rectifier of the second subsystem, the DC-DC converters being connected in series or in parallel with one another on output sides of the DC-DC converters.

5. The circuit system as claimed in claim 1, the same DC-DC converter being connected downstream of the rectifier of the first subsystem and the rectifier of the second subsystem, the rectifiers being connected in series or in parallel via a changeover logic unit on their output side.

6. The circuit system claimed in claim 1, the DC-DC converter being a step-down converter.

7. The circuit system as claimed in claim 1, the transformer being a medium voltage transformer.

8. A charging station comprising system as claim 1.

9. The use of a charging station as claimed in claim 8 for charging an energy store of a vehicle.

* * * * *